United States Patent [19]

Petersen

[11] Patent Number: 4,547,207
[45] Date of Patent: Oct. 15, 1985

[54] AIR CLEANING DEVICE

[76] Inventor: Ross T. Petersen, 18500 32nd Ave. North, Plymouth, Minn. 55447

[21] Appl. No.: 634,294

[22] Filed: Jul. 25, 1984

[51] Int. Cl.⁴ .............................................. B01D 45/12
[52] U.S. Cl. ........................................ 55/394; 55/426; 55/430; 55/449
[58] Field of Search ............... 55/391, 393, 394, 396, 55/404, 405, 408, 409, 424, 426, 430, 449, 451, 452, 454, 456, 457

[56]  References Cited

U.S. PATENT DOCUMENTS

| 2,732,032 | 1/1956 | Sandison | 55/457 |
| 3,552,102 | 1/1971 | Araki | 55/449 |
| 3,566,586 | 3/1971 | Langness | 55/451 |
| 3,740,932 | 6/1973 | Borsheim | 55/394 |
| 3,973,937 | 8/1976 | Petersen | 55/449 |
| 4,013,137 | 3/1977 | Petersen | 180/69 R |
| 4,201,557 | 5/1980 | Petersen | 55/327 |
| 4,285,707 | 8/1981 | Pfenninger | 55/457 |
| 4,373,940 | 2/1983 | Petersen | 55/328 |
| 4,459,141 | 7/1984 | Burrington et al. | 55/391 |

FOREIGN PATENT DOCUMENTS 683139  11/1952  United Kingdom .................. 55/449

Primary Examiner—David L. Lacey
Attorney, Agent, or Firm—Leo Gregory

[57]  ABSTRACT

An air cleaning device having a chamber receiving an incoming air stream wherein the improvement consists of the chamber progressively confining the incoming air stream to increase its linear and angular velocity and having an exhaust chamber receiving contaminants and isolating the same from the turbulence of the incoming air stream and a shield adjacent the dome of the device restricting the vertical clearance of the chamber receiving the incoming air stream.

1 Claim, 4 Drawing Figures

AIR CLEANING DEVICE

BACKGROUND OF THE INVENTION

1. Field of Invention

This invention relates to an air cleaning device.

2. Description of the Prior Art

Air precleaners are in general use for separation of contaminants from an air stream to provide clean air for purposes such as for ventilation and such as for use in the carburetion of an internal combustion engine. Devices used provide for separation of contaminants from air as by centrifugal forces and for a discharge of the contaminants. Much of the efficiency of prior art devices is lost by the absence of positive pressures both in the separation and in the removal of the contaminants.

SUMMARY OF THE INVENTION

The device herein is particularly adapted to remove contaminants from an incoming stream of ambient air, an intake chamber being arranged to accelerate the intake speed of the incoming stream of air, to cause a centrifugal action of the air stream to come into effect and to isolate the separated contaminants into a separate chamber free from the agitation of the turbulence present in the intake chamber.

The device herein comprises a cylindrical dome shaped housing having an annular bottom intake opening having angularly disposed vanes spaced within said opening, a chamber receiving an incoming air stream, said chamber having a vertical conical divider therein progressively confining the incoming air stream, increasing its linear and angular velocity and having an exhaust chamber receiving the contaminants separated from the incoming air stream and isolating said separated contaminants from the turbulence present in said first mentioned chamber and discharging said contaminants.

These and other objects and advantages of the invention will be set forth in the following description made in connection with the accompanying drawings in which like reference characters refer to similar parts throughout the several views.

DESCRIPTION OF A PREFERRED EMBODIMENT

Figure 1:
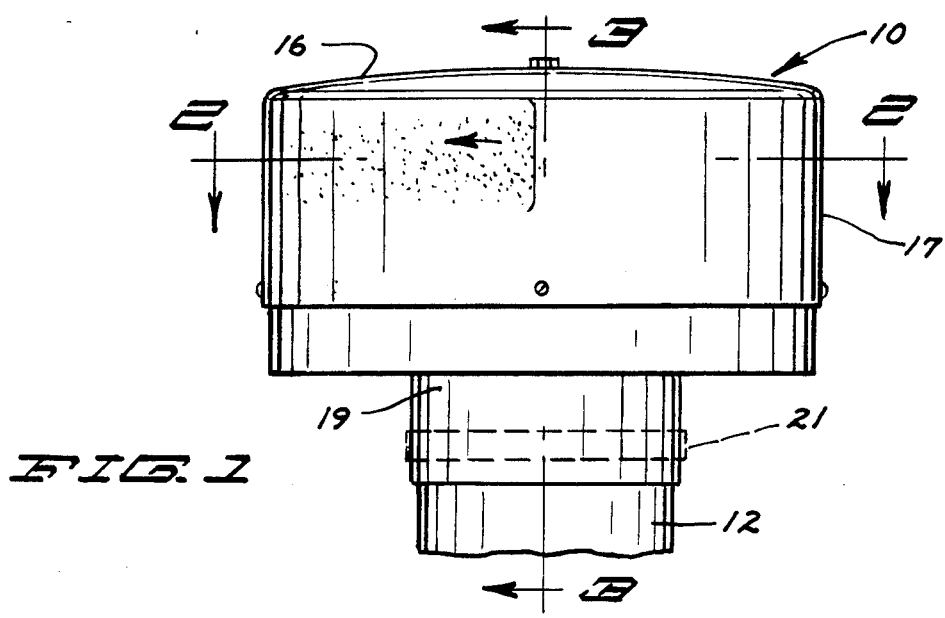
FIG. 1 is a view in front elevation of an air cleaning device.

Referring to the drawings, the invention herein comprises an air precleaning device or an air precleaner as indicated generally by the reference numeral 10.

Said device is substantially cylindrical in form as indicated in FIG. 1 wherein it is shown in an operating position mounted onto a pipe 12 which is the outer terminal portion of an air intake pipe such as for an automotive vehicle driven by an internal combustion engine with the passage 13 in said pipe conducting clean air to the carburetion system of said engine, to a compressor, or for ventilation, as the case may be.

The device has a housing 15 having a fairly shallow dome shaped top 16. Extending downwardly from said dome shaped top is a side wall 17 which may be suitably formed of plastic or sheet metal. Within the upper portion of said housing is a separation chamber 18.

Extending concentrically into said side wall 17 structure is a sleeve 19 which receives within the lower extended portion thereof the adjacent end portion of said pipe 12, said sleeve and said pipe being shown secured together by an annular external strap clamp 21. Said sleeve has a passage 22 therethrough and the upper inner end of said passage 22 forms the mouth 23 from which entry point air travels through the passage 13 of said pipe 12 to be used in the combustion process of the engine to which said pipe leads.

Extending downwardly from said wall 17 is an annular skirt 25 secured by rivets or metal screws 26 to said wall 17. Said skirt has an upwardly inwardly extending tapered wall portion 25a which forms an inner chamber 27 to be further described. A lower portion 18a of said chamber 18 extends between said wall portion 25a and the adjacent sidewall 17.

Figure 2:
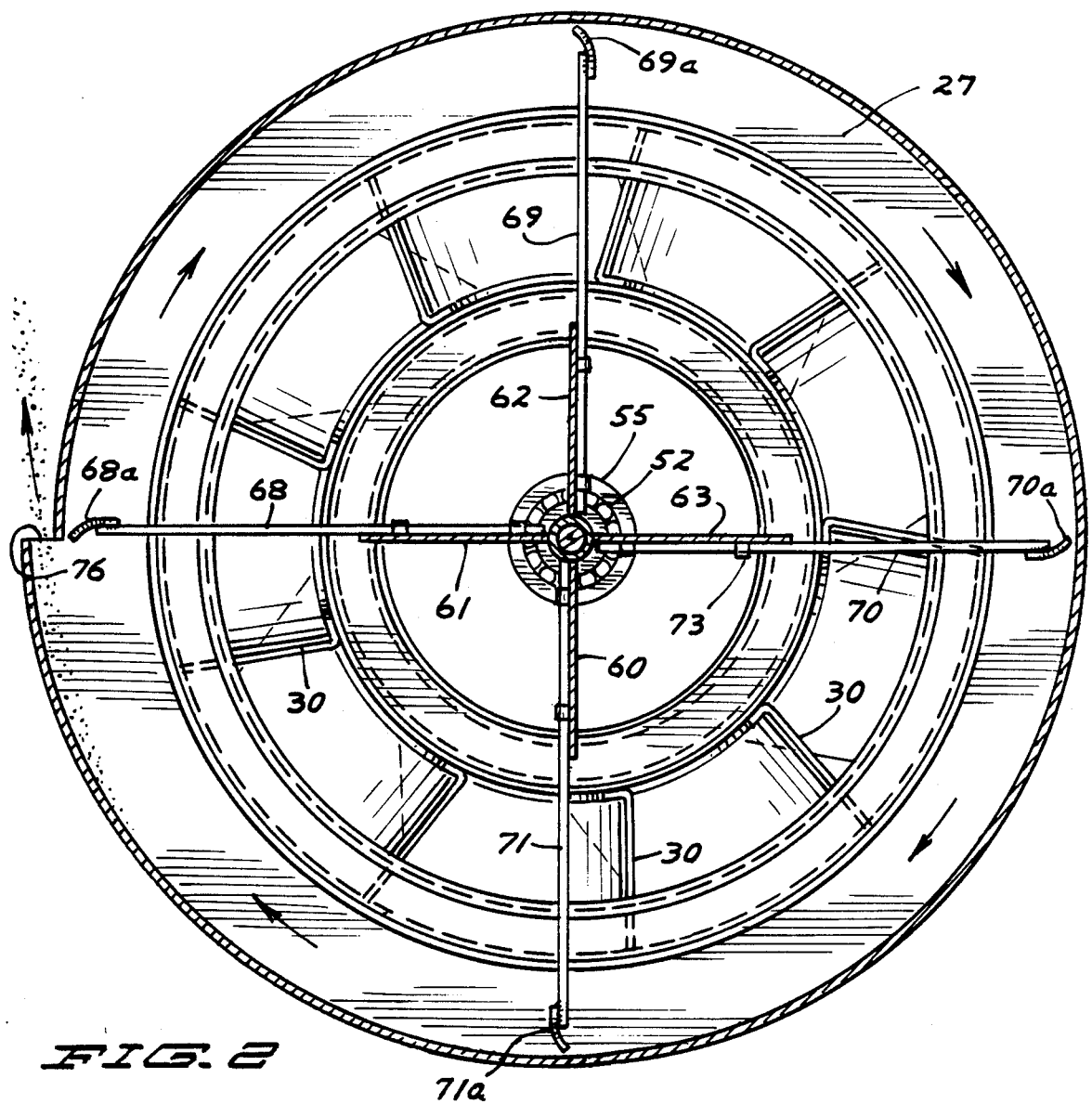
FIG. 2 is a magnified view in horizontal section taken on line 2—2 of FIG. 1 as indicated.
Figure 3:
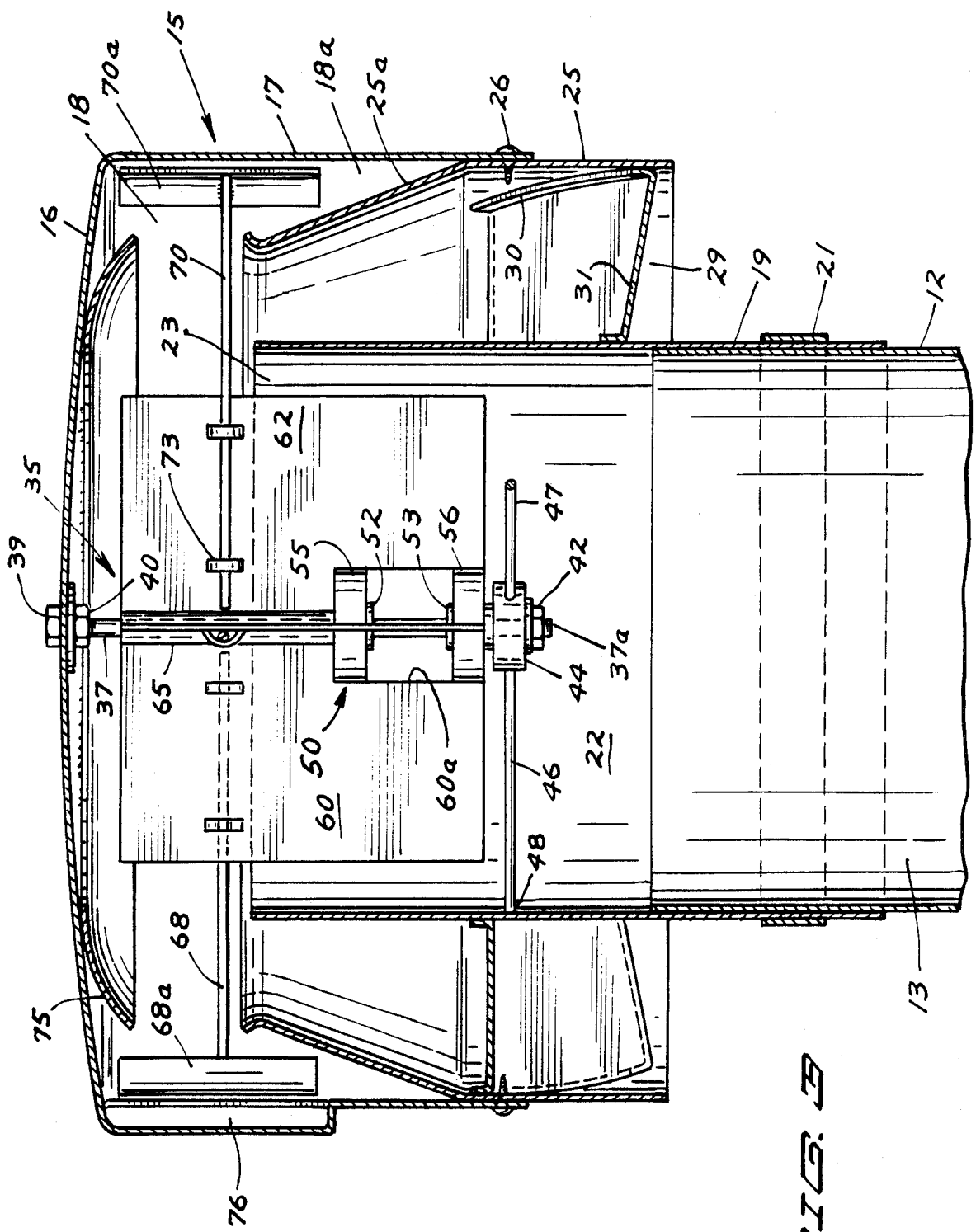
FIG. 3 is a magnified view in vertical section taken on line 3—3 of FIG. 1 as indicated.

Said skirt 25 in being disposed about said sleeve 19 forms an annular passage 29 therebetween. Disposed within said passage 29 and spaced about said sleeve are a plurality of vanes 30. Said vanes will be positioned to be inclined upwardly circumferentially such as at an angle of 30°-35° and will overlap each other somewhat to accelerate the inward passage of an air stream and cause a centrifugal action to force entrained airborne particles to be thrust against the outer side wall. Said vanes may be secured by being welded to the adjacent surfaces of said skirt 25 and of said sleeve 19 and by having inwardly angled struts 31 welded to said sleeve 19, thus firmly securing said sleeve and skirt in spaced relation. Said vanes are illustrated in FIGS. 2 and 3. It will be noted that said sleeve 19 extends upwardly to substantially the plane of the top of said tapered wall portion 25a.

Disposed within said passage 22 is a spinner assembly 35 comprising a shaft 37 which is here shown having its upper end portion extending through the dome 16 to be secured by an outer nut 39 and an inner locknut 40. Said shaft may otherwise be mounted.

Said shaft has its lower end portion 37a extending through a hub 44 and secured by a nut 42. Said hub is here shown formed into a spider having radial arms spaced at 120° intervals and of which arms 46 and 47 are shown, said arms extend to and are secured as by welding to the adjacent wall portion of said sleeve 19 as indicated at 48.

Mounted upon said shaft 37 adjacent said hub 44 is a bearing assembly 50 here shown having vertically spaced bearings 52 and 53 secured to said shaft and carrying ring members 55 and 56 which rotate about said bearings.

Mounted onto said ring members and shown here to be rectangular in plan are blades or vanes 60-63 spaced at 90° intervals about said shaft 37 and said blades are cut out at their bottoms as at 60a to accommodate and be secured to said ring members. Said blades have a common tubular juncture 65 disposed about said shaft 37. Said bearings 52 and 53 and their respective ring members 55 and 56 are sufficiently stable to support said blades for their free rotational movement.

Carried by said blade members 60-63 are rods 68-71 secured to said blades as by the clamps 73 struck from said blades. Said rods extend radially having air scoops 68a–71a mounted upon their free ends, said air scoops being indicated as being arcuate in cross section as indicated in FIG. 2. Said rods are of a length to position said air scoops within the chamber 18 and the portion 18a thereof adjacent the wall 17 for discharge of contaminants out of an air exhaust port or ports 76 (only one being shown) formed in said side wall 17. The ports shall be of such a number as to accommodate the proper amount of air intake and discharge. Said rods are positioned vertically to clear the tapered sleeve 25a.

To assist in confining turbulence to the chamber 27, there may be provided, as here shown, a dome like shield 75 arcuate in cross section and having an open center portion which underlies the dome 16 and is secured thereto as by welding. Said shield restricts the otherwise clearance between the chamber 27 and the dome 16. The chamber portion 18a becomes in effect an isolation chamber wherein the turbulence created in exhausting or discharging the contaminants is retained and kept from disturbing the continuous uniform flow of air moving through the separation chamber 27 and the central portion of the chamber 18.

The incoming air stream enters the annular passage 29 and is directed into a spinning or rotational movement by the vanes 30. As said airstream is drawn upwardly, the rotational movement of said air stream and the acceleration of such movement by its progressive confinement by the tapering of the wall 25a and by the spinning of the blades 60–63 generates significant centrifugal forces which cause particles in the air stream to be thrust outwardly against the wall 17 at which point the air scoops 68a–71a engage said contaminants and cause them to be discharged out of the exhaust port(s) 76.

The passage 22 is a clean air passage. The blades 60–63 are in constant rotational motion with the air scoops 68a–71a. The upper portions of the blades 60–63 which extend above the plane of the top of the inclined wall 25a engage the particles of contaminants which may be present in the air stream drawn into the mouth 23 and thrust the same outwardly to said outer side wall 17 to be engaged and discharged by the scoops 68a–71a. The major portion of the contaminants will be centrifuged out and thrust in the direction of the outer wall 17 by the swirling action of the incoming air stream through the separation chamber 27.

MODIFICATION

Figure 4:
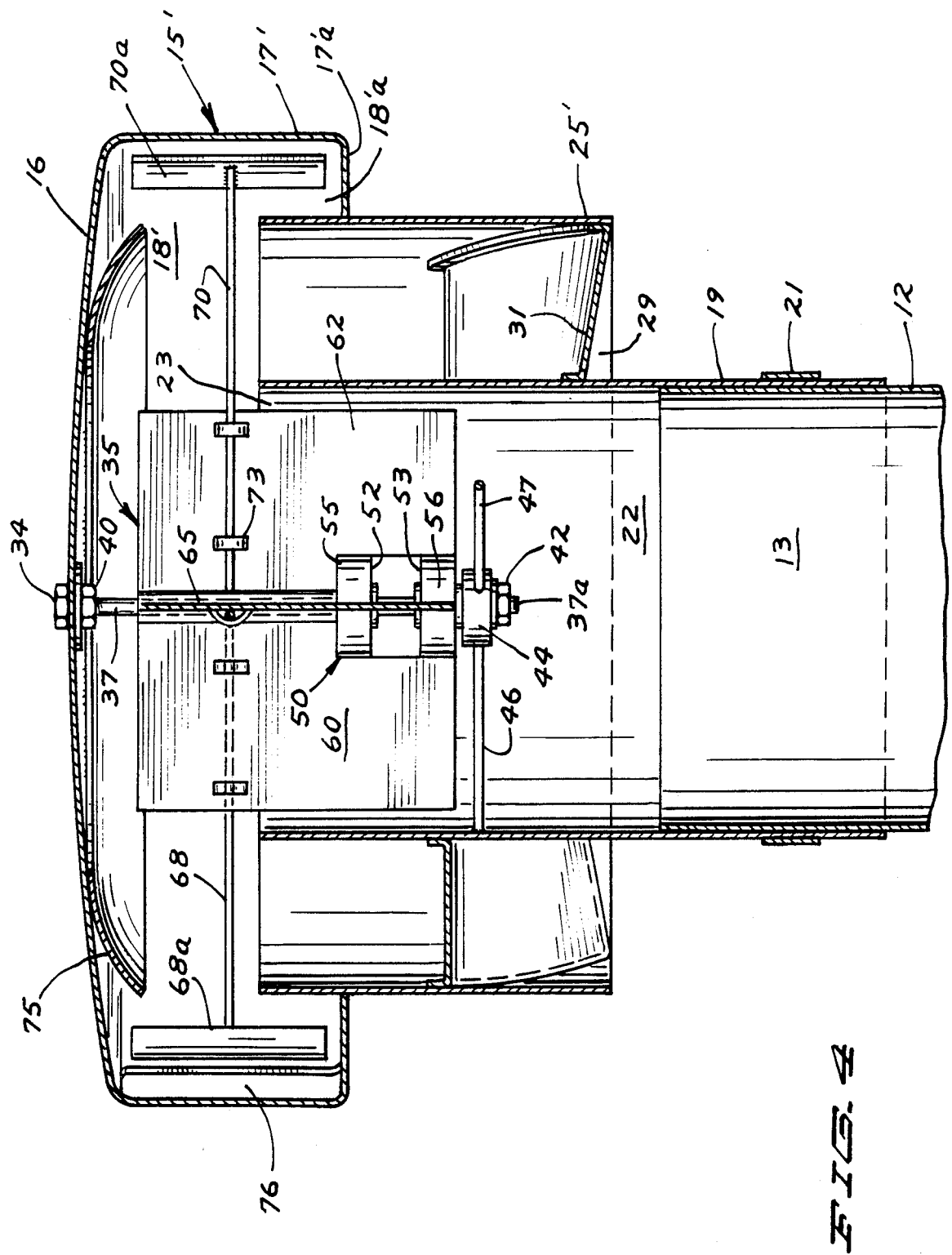
FIG. 4 is a view similar to that of FIG. 3 showing a modification.

Referring to FIG. 4, a modification is shown of the structure above described and in which like reference numerals shall indicate like structure as above described and for the most part will not be further described and like reference numerals with a prime added shall indicate a modification of such structure.

As above described, the sleeve 19 receives the pipe 12 and the same are secured together by the clamp 21.

Formed about said sleeve 19 and concentric therewith is a skirt 25' which differs from skirt 25 in forming a straight vertical wall with a uniform clearance between itself and said sleeve 19.

The side wall 17 is shortened as indicated by 17' and is angled inwardly at 17'a to encircle the sleeve 25' and be suitably secured thereto.

The isolation chamber at 18'a and the chamber 18' has been reduced as to height and the separation area has been condensed all of which provides a very efficient separation of contaminants and a very suitable supply of clean air for whatever purpose it may be desired.

It will of course be understood that various changes may be made in the form, details, arrangement and proportions of the product without departing from the scope of applicant's invention which, generally stated, consists in a product capable of carrying out the objects above set forth, such as disclosed and defined in the appended claims.

What is claimed is:
1. An air cleaning device, having in combination
a substantially cylindrical housing comprising a dome member and a depending cylindrical side wall structure forming a separation chamber therein,
a tubular sleeve extending upwardly into said separation chamber concentric with said housing and forming therein a clean air passage,
said sleeve being spaced from said side wall structure to form an outside air inlet passage therebetween,
a spinner assembly comprising a plurality of blades supporting arms which have air scoops at their ends, means suspending said spinner assembly axially of said sleeve,
an annular open-ended skirt structure having its lower portion engaging and depending below said housing member and having its upper portion tapered extending to be substantially co-planar with the top of said sleeve and thus forming therein an elongated confining air inlet passage,
a vane assembly disposed about said sleeve within said air inlet passage and within the lower end portion of said skirt structure,
said air scoops being disposed between said upper portion of said skirt structure and said wall structure, and
discharge means in said side wall structure open to the atmos

* * * * *